US006622300B1

(12) United States Patent
Krishnaswamy et al.

(10) Patent No.: US 6,622,300 B1
(45) Date of Patent: Sep. 16, 2003

(54) DYNAMIC OPTIMIZATION OF COMPUTER PROGRAMS USING CODE-REWRITING KERNAL MODULE

(75) Inventors: Umesh Krishnaswamy, Sunnyvale, CA (US); Lacky V. Shah, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/295,548

(22) Filed: Apr. 21, 1999

(51) Int. Cl.[7] ................................................ G06F 9/44
(52) U.S. Cl. .................... 717/130; 717/140; 717/151
(58) Field of Search .......................... 717/9, 5, 7, 8, 717/148–161, 226

(56) References Cited

U.S. PATENT DOCUMENTS

| 5,375,242 | A | | 12/1994 | Kumar et al. ................... 717/1 |
| 5,450,586 | A | * | 9/1995 | Kuzara et al. ................ 717/124 |
| 5,471,564 | A | | 11/1995 | Dennis et al. ............. 358/1.15 |
| 5,475,842 | A | | 12/1995 | Gilbert et al. .................. 717/1 |
| 5,481,708 | A | | 1/1996 | Kukol ............................ 717/1 |
| 5,519,866 | A | | 5/1996 | Lawrence et al. .............. 717/1 |
| 5,535,391 | A | | 7/1996 | Hejlsberg et al. ............... 717/1 |
| 5,586,329 | A | | 12/1996 | Knudsen et al. ................ 717/2 |
| 5,586,330 | A | | 12/1996 | Knudsen et al. ................ 717/5 |
| 5,590,331 | A | | 12/1996 | Lewis et al. .................... 717/8 |
| 5,594,899 | A | | 1/1997 | Knudsen et al. ................ 707/2 |
| 5,596,752 | A | | 1/1997 | Knudsen et al. ................ 717/1 |
| 5,815,720 | A | | 9/1998 | Buzbee .......................... 717/9 |
| 5,838,962 | A | | 11/1998 | Larson ........................ 712/239 |
| 5,915,114 | A | * | 6/1999 | McKee et al. .............. 717/158 |
| 6,006,033 | A | * | 12/1999 | Heisch ........................... 717/9 |
| 6,202,205 | B1 | * | 3/2001 | Saboff et al. ............... 717/158 |
| 6,219,825 | B1 | * | 4/2001 | Burch et al. ................ 717/158 |
| 6,233,678 | B1 | * | 5/2001 | Bala .............................. 717/9 |

OTHER PUBLICATIONS

"Shade: A Fast Instruction–Set Simulator for Execution Profiling," Bob Cmelik and David Keppel, Association for Computing Machinery (ACM, Inc.), 1994.

"Shade: A Fast Instruction–Set Simulator for Execution Profiling," Robert F. Cmelik and David Keppel, Technical Report UWSCE Jun. 6, 1993,.

* cited by examiner

Primary Examiner—Gregory Morse
Assistant Examiner—Chuck Kendall

(57) ABSTRACT

The present invention is a system and method of using a kernel module to perform dynamic optimizations both of user programs and of the computer operating system kernel, itself. The kernel module permits optimized translations to be shared across a computer system without emulation because the kernel module has the privileges necessary to write into the computer program text in shared user memory space. In addition, the kernel module can be used to optimize the kernel itself because it, too, is located in the kernel memory space.

17 Claims, 6 Drawing Sheets

DYNAMIC OPTIMIZATION OF COMPUTER PROGRAMS USING CODE-REWRITING KERNAL MODULE

FIELD OF THE INVENTION

The present invention relates to a method and apparatus for the dynamic optimization of computer programs.

BACKGROUND TO THE INVENTION

The source code of a computer program is generally written in a high-level language that is humanly readable, such as FORTRAN or C. The source code is translated by a compiler program into an assembly language. The binary form of the assembly language, called object code, is the form of the computer program that is actually executed by a computer. Object code is generally comprised of assembly language or machine language for a target machine, such as a Hewlett-Packard PA-RISC microprocessor-based computer. The object code is generally first produced in object code modules, which are linked together by a linker. For the purposes of the present invention, the term "compile" refers to the process of both producing the object code modules and linking them together.

Because computer programs are written as source code by humans, it is usually not written in a way to achieve optimal performance when eventually executed as object code by a computer. Computer programs can be optimized in a variety of ways. For example, optimizing compilers perform static optimization before the code is executed. Static optimization can be based on particular rules or assumptions (e.g., assuming that all "branches" within a code are "Taken"), or can be profile-based. To perform profile-based optimization ("PBO"), the code is executed under test conditions, and profile information about the performance of the code is collected. That profile information is fed back to the compiler, which recompiles the source code using the profile information to optimize performance. For example, if certain procedures call each other frequently, the compiler can place them close together in the object code file, resulting in fewer instruction cache misses when the application is executed.

Dynamic optimization refers to the practice of optimizing computer programs as they execute. Dynamic optimization differs from static optimization in that it occurs during runtime, not during compilation before runtime. Generally, dynamic optimization is accomplished as follows. While a computer program is executing, a separate dynamic optimization program observes the executing computer program and collects profile data. The dynamic optimization program can be implemented as a dynamically loadable library (DLL), as a subprogram inserted into the computer program by a compiler before runtime, or by a variety of other means known in the art.

The profile data can be collected by "instrumenting" the object code. Instrumentation of code refers to the process of adding code that generates specific information to a log during execution. The dynamic optimization program uses that log to collect profile data. Instrumentation allows collection of the minimum specific data required to perform a particular analysis. General purpose trace tools can also be used as an alternative method for collecting data. Instrumentation can be performed by a compiler during translation of source code to object code. Those skilled in the art will recognize that the object code can also be directly instrumented by a dynamic translator performing an object code to object code translation, as explained more fully in U.S. patent application No. 5,815,720, issued to William B. Buzbee on Sep. 29, 1998, and incorporated by reference herein.

Once the code is instrumented and executed, the dynamic optimization program collects the profile data generated by the instrumentation. The dynamic optimization program analyzes the profile data, looking, for example, for "hot" instruction paths (series of consecutive instructions that are executed often during execution). The dynamic optimization program then optimizes portions of the computer program based on the profile data.

Dynamic optimization is generally accomplished without recompilation of the source code. Rather, the dynamic optimization program rewrites a portion of the object code in optimal form and stores that optimized translation into a code cache. A hot instruction path, for example, might be optimized by moving that series of instructions into sequential cache memory locations. Once the optimized translations are written into the code cache, the dynamic optimization program switches execution flow of control to the optimized translations in the code cache when any of the optimized instructions are thereafter called.

Prior art dynamic optimizers have several disadvantages. First, because the dynamic optimization program is located in user memory space, it has limited privileges. Computer memory is allocated by the computer's operating system into several categories. One demarcation is between user memory space and kernel memory space. Kernel memory space is generally reserved for the computer operating system kernel and associated programs. Programs residing in kernel memory space have unrestricted privileges, including the ability to write and overwrite in user memory space. By contrast, programs residing in user space have limited privileges, which causes significant problems when performing dynamic optimization in the user space.

Modern computers permit a computer program to share its program text with other concurrently executing instances of the same program to better utilize machine resources. For example, three people running the same word processing program from a single computer system (whether it be a client server, multiple-CPU computer, etc.) will share the same computer program text in memory. The program text, therefore, sits in "shared user memory space," which is accessible by any process running on the computer system.

As explained above, however, in order to perform dynamic optimization, the dynamic optimization program must be able to alter the program text to direct flow of control to the optimized translations in the code cache. Because the dynamic optimization program sits in user memory space, it does not have the privilege to write into the program text. Accordingly, as illustrated in FIG. 1, the program text must be emulated so that the dynamic optimization can take place in private memory space dedicated to the particular process being executed.

Referring to FIG. 1, computer program text 10 (object code after compilation), is emulated by a software emulator 20 that is included within a dynamic optimization program 30. "Emulation" refers to the "software execution" of the computer program text 10. The computer program text 10 is never run natively. Rather, the emulator 20 reads the computer program text 10 as data. The dynamic optimization program 30 (including the emulator 20) ordinarily takes the form of a shared library that attaches to different processes running the computer program text 10. In the example shown in FIG. 1, three different instances of the same computer program 10 are being run via processes A, B, & C.

Focusing on Process A, for example, the dynamic optimization program 30 collects profile data during emulation of instructions for Process A. Based on that profile data, the dynamic optimization program 30 creates optimized translations of portions of the instructions called by Process A and inserts them into an optimized translation code cache 40 stored in private memory space allocated for Process A. Thereafter, when a previously optimized instruction is called by Process A, flow of control is forwarded to the optimized translation for that instruction in the code cache 40. Optimization of instructions for each of the other processes (B and C) works in the same manner.

There are several problems with this approach. First, running a computer program 10 through an emulator 20 is on the order of fifty times slower than running the computer program 10 natively. Second, because the optimized translations are stored in private user memory space specific to particular processes, they are not shared across the computer system, thereby causing significant duplication of work. Individual processes do not have access to other processes' optimized translations. Finally, because the dynamic optimization program 10 does not have the privilege of writing into kernel space, there is no way to optimize the computer operating system kernel.

What is needed is a method and apparatus to dynamically optimize computer programs that permits optimized translations to be shared across a computer system.

What is needed is a method and apparatus to dynamically optimize computer programs without degrading the performance of the programs.

What is needed is a method and apparatus to dynamically optimize computer programs that permits optimization of the computer operating system kernel.

SUMMARY OF THE INVENTION

The present invention solves the problems of the prior art by using a kernel module to perform dynamic optimizations both of user programs and of the computer operating system kernel, itself. The kernel module permits optimized translations to be shared across a computer system without emulation because the kernel module has the privileges necessary to write into the computer program text in shared user memory space. In addition, the kernel module can be used to optimize the kernel itself because it, too, is located in the kernel memory space.

The method of the present invention generally comprises loading a computer program to be optimized into shared user memory space; executing the computer program; analyzing the computer program as it executes, including the substep of collecting profile data about the computer program; providing profile data to a kernel module located in kernel memory space; generating at least one optimized translation of at least one portion of the computer program using the kernel module; and patching the computer program in shared user memory space using the at least one optimized translation as the computer program continues to execute.

The apparatus of the present invention generally comprises at least one processor, adapted to execute computer programs, including computer programs that are part of a computer operating system program kernel; and a memory, operatively connected to the processor, adapted to store in kernel memory space a computer operating system program kernel and a code-rewriting kernel module, wherein the code-rewriting kernel module is adapted to receive profile information regarding a computer program while it is executing and to optimize at least a portion of that executing computer program.

DETAILED DESCRIPTION OF THE INVENTION

Figure 1:
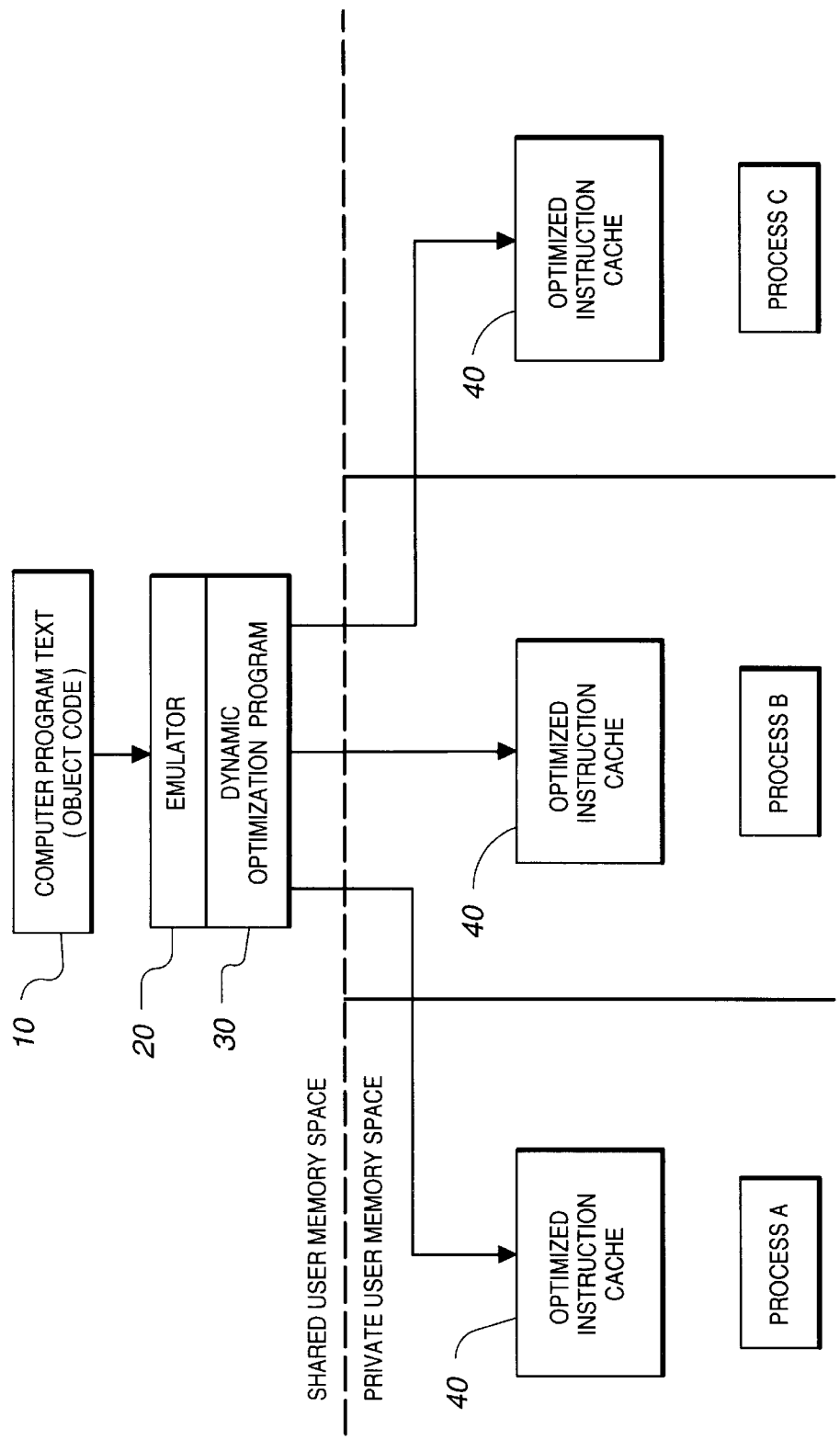
FIG. 1 is a block diagram of a dynamic optimization system of the prior art.
Figure 2:
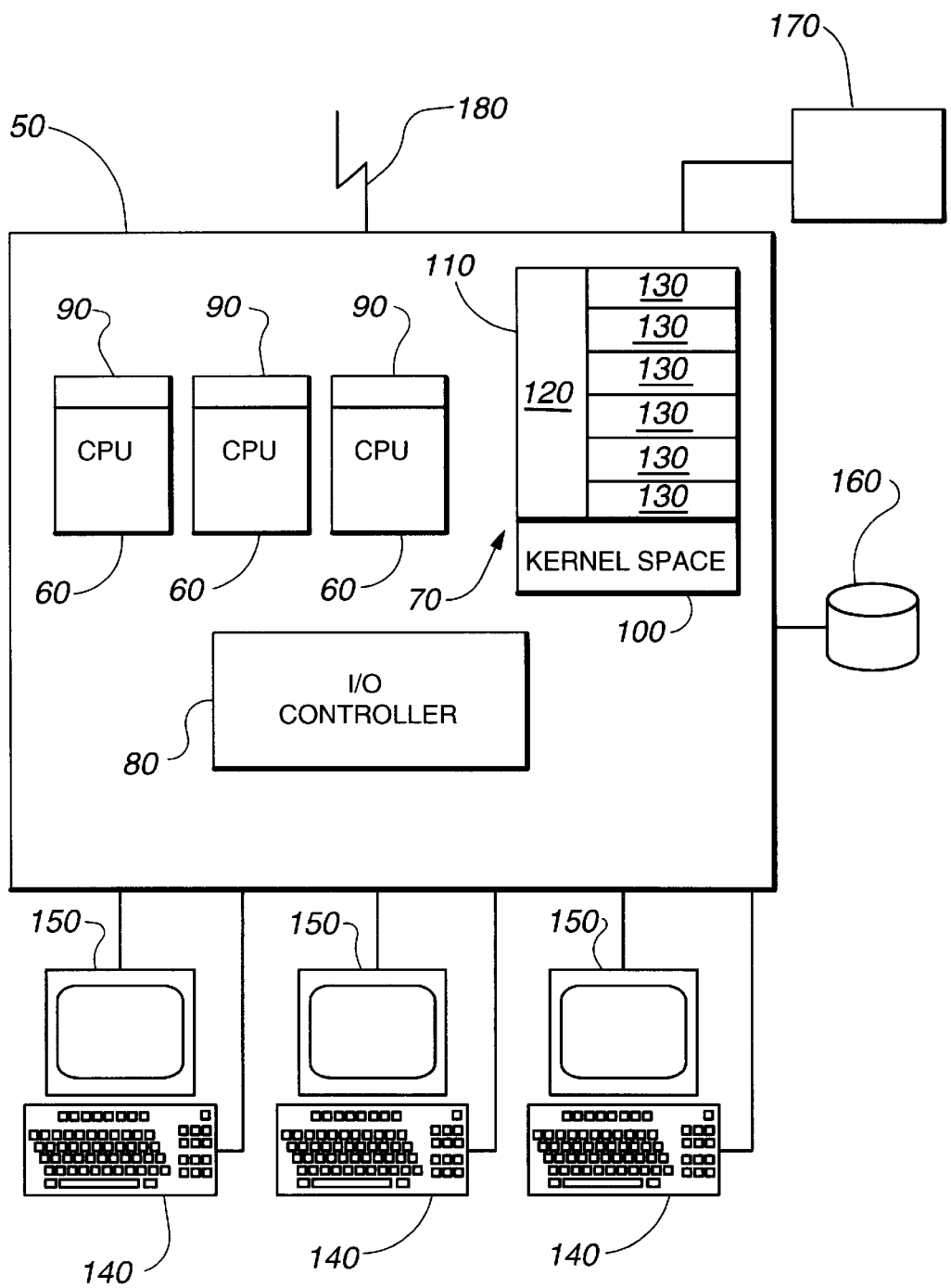
FIG. 2 is a block diagram of a computer system according to the present invention.

FIG. 2 is a block diagram of a computer system 50 that is used to implement the methods and apparatus embodying the present invention. The computer system 50 includes as its basic elements: several CPUs 60, a memory 70, and an I/O controller 80. The CPUs 60 preferably include performance monitoring units (PMUs 90), which are able to nonintrusively collect profile information about instructions executed by the CPUs 60. The memory 70 includes within it, among other things, allocated kernel memory space 100 and user memory space 110. In addition, the user memory space 110 is allocated into shared user memory space 120 and private process user memory space 130. The CPUs 60, memory 70, and I/O controller 80 are all connected via a bus structure. The I/O controller 80 controls access to and information from external devices such as keyboards 140, monitors 150, permanent storage 160, and a removable media unit 170. In addition, the computer system may be connected through a network connection 180 to other computer systems.

It should be understood that FIG. 2 is a block diagram illustrating the basic elements of a computer system. This figure is not intended to illustrate a specific architecture for the computer system 50 of the present invention. For example, no particular bus structure is shown because various bus structures known in the field of computer design may be used to interconnect the elements of the computer system 50 in a number of ways, as desired. Each of the CPUs 60 may be comprised of a discrete arithmetic logic unit (ALU), registers, and control unit or may be a single device in which these parts of the CPU are integrated together, such as in a microprocessor. Moreover, the number and arrangement of the elements of the computer system 50 may be varied from what is shown and described in ways known in the art (i.e., client server systems, computer networks, etc.) The operation of the computer system 50 depicted in FIG. 2 is described in greater detail in relation to FIGS. 3 through 7.

Figure 3:
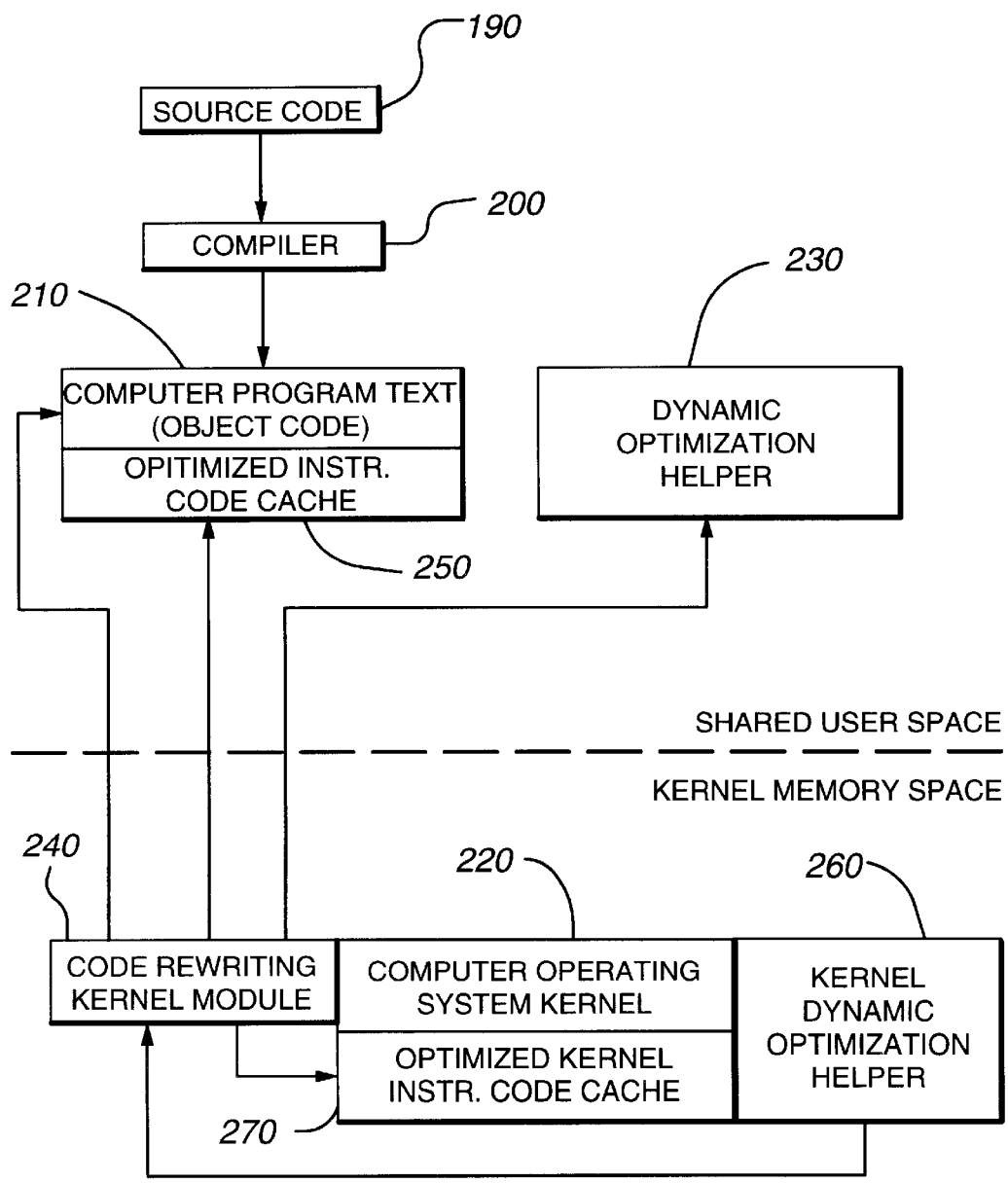
FIG. 3 is a block diagram illustrating a preferred embodiment of the present invention.

FIG. 3 is a block diagram of a preferred embodiment of the present invention. In this embodiment, a source code 190 is fed to a compiler 200 where it is compiled into an object code representing the computer program text 210. The object code 210 is loaded into shared user memory space, by the computer operating system kernel 220 or a dynamic loader. If the computer program text 210 is enabled for dynamic optimization, the dynamic loader will also load into shared user space a "dynamic optimization helper" 230. The dynamic optimization helper 230 can take the form of a shared library. In addition, the dynamic loader (or computer operating system kernel 220) can enable every program 210 for dynamic optimization as a default, or that decision can be made based on characteristics of the computer program 210 or by the user himself.

As an alternative, the dynamic optimization helper 230 can take the form of a "daemon" process spawned by the computer operating system kernel 220. A daemon is a continually running computer process. Here, the daemon can have multiple threads to accommodate the dynamic optimization of several processes running the computer program text 210.

Figure 4:
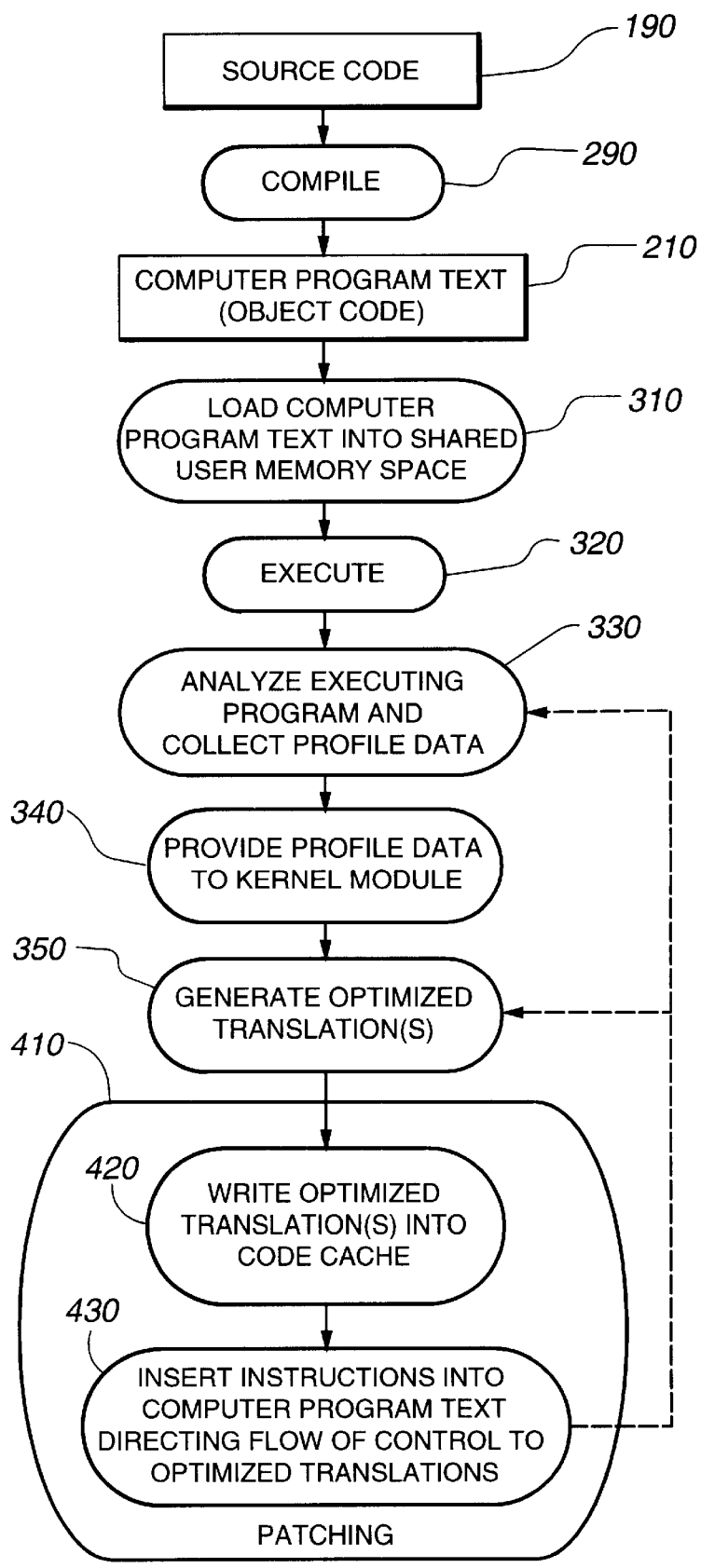
FIG. 4 is a flow chart illustrating a preferred method of the present invention for dynamically optimizing computer programs in user memory space.

As described more specifically with relation to FIG. 4, the dynamic optimization helper 230 in shared user space (whether a shared library or a daemon process) is responsible for collecting profile data, preprocessing the profile data, and sending a streamlined form of profile data to a code-rewriting kernel module 240 located in kernel memory space. The code-rewriting kernel module 240 analyzes the profile data and generates optimized translations of portions of the computer program 210 from the profile data. The kernel module 240 then writes the optimized translations into a code cache 250 in shared user memory space. The kernel module 240 also inserts jump instructions into the computer program text 210 to switch execution flow of control to the optimized translations whenever an optimized instruction within the computer program text 210 is called by a process. Because the computer program text 210 does not need to be emulated and the optimized instruction code cache 250 is in shared user memory space, all processes supported by the computer system 50 have the benefit of the optimized translations.

In addition, the embodiment illustrated by FIG. 3 permits the optimization of the computer operating system kernel 220, which is stored in kernel memory space along with the code-rewriting kernel module 240. Preferably, when the computer operating system kernel 220 is first initialized, a dynamic optimization helper 260, similar to the dynamic optimization helper 230 in shared user space, is attached to the computer operating system kernel 220 and loaded into kernel memory space. The dynamic optimization helper 260 in kernel memory space operates similarly to the dynamic optimization helper 230 in shared user memory space. It collects profile data regarding the executing computer operating system kernel 220, processes that profile data, and provides it to the code-rewriting kernel module 240. The kernel module 240 analyzes the profile data and generates optimized translations of portions of the computer operating system kernel 220 from the profile data. The code-rewriting kernel module 240 then writes the optimized translations into a code cache 270 in the kernel memory space. The kernel module 240 also inserts jump instructions into the computer operating system kernel 220 to switch execution flow of control to the optimized translations whenever an optimized instruction within the computer operating system kernel 220 is called.

FIG. 4 illustrates the basic method of the present invention for optimizing shared user computer programs. A source code 190 is first compiled 290. Compilation 290 results in computer program text 210 in the form of object code. The computer program text 210 is then loaded 310 into shared user memory space. If a shared-library dynamic optimization helper 230 is employed, it is also loaded into shared user memory space. As discussed, a daemon-process dynamic optimization program can alternatively be employed. Unless otherwise noted, for the remaining discussion of FIGS. 4–7, it is assumed that a shared-library dynamic optimization helper 230 is employed. The computer program text 210 is then executed 320 by one or more of the CPUs 60. During execution, the dynamic optimization helper 230 analyzes 330 the executing instructions and collects profile data. As part of this analysis, the dynamic optimization helper 230 searches for optimization opportunities. For example, the dynamic optimization helper 230 searches for "hot" instruction paths, as previously described. Typically, the dynamic optimization helper 230 will not grow traces that pass from the computer program text 210 through shared libraries. Otherwise, a user might unload a particular shared library and load a new one during execution, which would cause errors to occur if part of an optimized patch depended on the old shared library. It is preferred, therefore, that the helper 230 not grow traces through a shared library unless it can verify that the user does not have the capability to unload that shared library. Depending on the computer operating system employed, that determination is made possible by examining API system calls.

Profile data is preferably collected via the PMUs 90 included in the CPUs 60. Although the exact operation of PMUs 90 varies with different processors, generally they operate as follows. A PMU 90 includes multiple counters programmable to count events like: clock cycles; instructions retired; and number of stalls caused by events such as data cache/TLB misses, instruction cache/TLB misses, pipeline stalls, etc. Sophisticated PMUs 90 include trace buffers that record the history of branches and branch prediction, and addresses that caused cache/TLB misses, etc. PMU counters can be programmed to trigger an interrupt after a certain number of events, at which time the PMU counter values can be read. This method of reading PMU counters is known as sampling. The dynamic optimization helper 230 samples the PMU 90 history periodically to gather profile data and save it to a log. If the particular PMU 90 employed does not permit the dynamic optimization helper 230 to read or reprogram it from user memory space, the dynamic optimization helper 230 makes a system call to request that the computer operating system kernel 220 perform those functions. Using PMUs 90 to collect profile data is preferred over the method of instrumenting the object code during compilation because PMU 90 collection of profile data is nonintrusive and does not significantly degrade processing speed like instrumentation often does.

Preferably, the dynamic optimization helper 230 does not provide 340 all of the profile data to the kernel module 240. Rather, it is preferred that the dynamic optimization helper 230 streamline the profile data sent to the kernel module 240 because the computer operating system kernel 220 will allocate only a certain amount of processing time to the kernel module 240 to perform dynamic optimizations. Accordingly, the dynamic optimization helper 230 preferably provides only selected profile data, such as "annotated traces" of hot instruction paths. A "trace" is a series of basic blocks of code identified by the starting address of each basic block. "Annotations" to those traces may include summary profile data relating to particular traces. The summary profile data is preferably generated by the dynamic optimization helper 230, which preprocesses the raw profile data from the PMUs 90 in the manner known in the art. Examples of annotations include: probability that branches between basic blocks are taken or not taken; number and addresses of cache misses; amount of processing time spent in a trace, etc.

Figure 5:
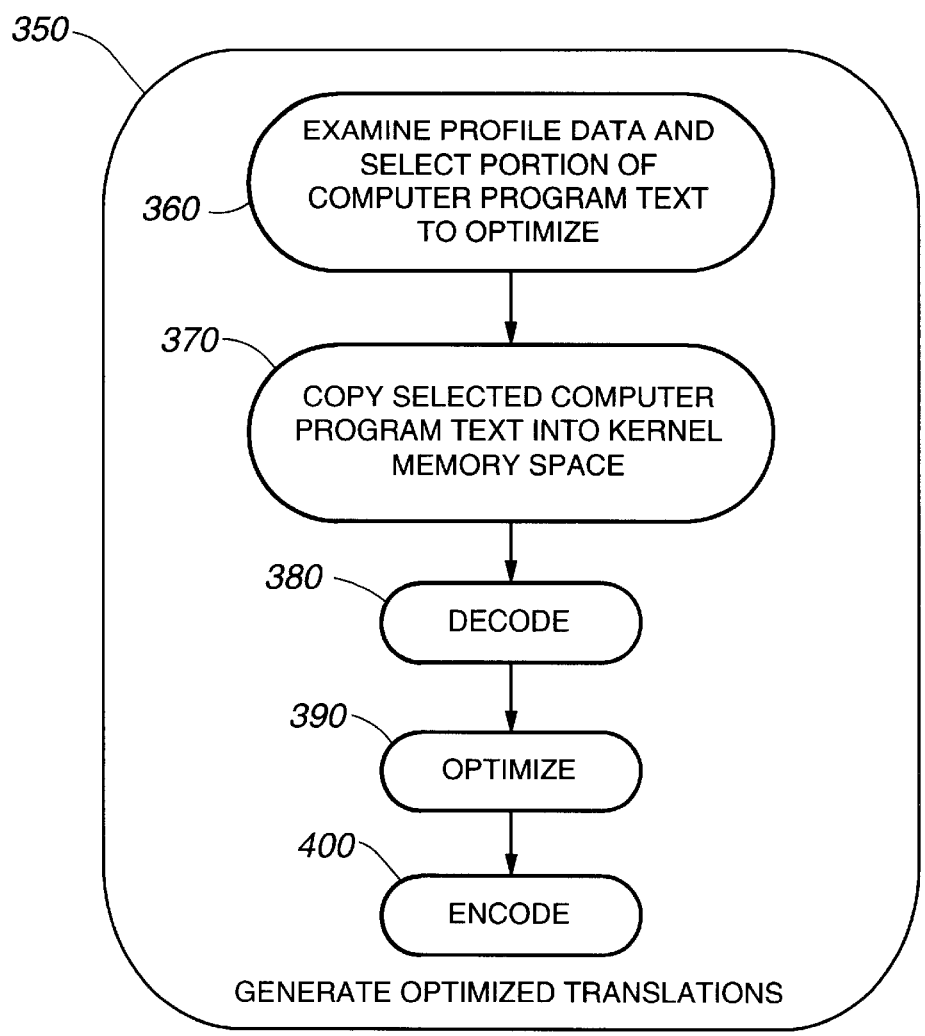
FIG. 5 is a flow chart illustrating in greater detail the generate step of the method shown in FIG. 4.

Once the streamlined profile data is provided 340 to the kernel module 240, the kernel module 240 uses that profile data to generate 350 optimized translations of certain portions of the computer program text 210. FIG. 5 illustrates in greater detail the step of generating 350 optimized translations. The kernel module 240 examines 360 the profile data and selects a portion of the computer program text 210 to optimize. For example, the kernel module 240 might select a section of computer program text 210 that includes all of the instructions identified as a hot instruction path by the dynamic optimization helper 230. The kernel module 240 copies 370 the selected computer program text 210 from shared user memory space into the kernel memory space. The computer program text 210 is then decoded 380 from object code into an intermediate code so that it can be optimized 390. Once optimized 390, the intermediate code is encoded 400 back into object code. Those of ordinary skill in the art will recognize that the decoding 380, optimization 390, and encoding 400 of the selected computer program text 210 can be accomplished in a variety of ways, and the present invention is not limited to any particular method for accomplishing those processes.

Referring back to FIG. 4, once an optimized translation is generated by the kernel module, it is used to patch 410 the computer program text 210. As used herein, "patching" 410 refers broadly to any method of utilizing optimized translations. One method for doing so is further illustrated in FIG. 4. The kernel module writes 420 the optimized translation into a code cache 250 allocated at the end of the same memory space where the computer program text 210 is stored. If no such code cache 250 exists, the kernel module 240 allocates one. In addition, the kernel module 240 inserts 430 jump instructions into the computer program text 210 directing flow of execution control to the optimized translation whenever one of the instructions included within the optimized translation is called. The kernel module 240 is permitted to write into the computer program text 210 because, as a trusted kernel module 240, it has unrestricted privileges to write into user space. In addition, as discussed, because the optimized translations are stored in shared user memory space and the present invention does not require an emulator, different processes running the same computer program text 210 on the same computer system 50 have the benefit of the optimized translations.

The following is a general example of how a jump instruction is inserted 430. Assume that the computer program text 210 reads as follows:

```
0x100 nop ld.4 sub
0x110 ld.8 add br
0x120 st.8br call
...
```

If a "hot trace" is identified as beginning at 0x110, the present invention replaces the bundle at 0x110 with a branch jumping to the optimized trace in the code cache 250:

```
ox100 nop 1d4 sub
0x110 nop nop br 0xff0 -> jump to the code cache
0x120 st.8br call
```

The optimized trace in the code cache 250 then appears as follows:

```
0xff0 ld.8 add br
...
```

It is preferred that all exits from the optimized trace in the code cache 250 point back to the computer program text 210.

When inserting jump instructions into the computer program text 210, it is important that the kernel module 240 ensure atomicity. Processors ensure a certain size of "atomic unit"—the maximum size of instruction or data that the processor guarantees will not be interrupted during writing or execution. For most processors, the atomic unit is four bytes (one "word"). On occasion, a jump instruction according to the present invention will exceed the size of the atomic unit guaranteed by the applicable CPU 60. In that instance, the following procedure may be used to ensure atomicity.

After the optimized translation is written into the code cache, a one-word "cookie" is placed in the computer program text 210 where the jump instruction is to be inserted. If executed, the cookie directs flow of control to an illegal instruction handler installed by the dynamic optimization helper 230. Then the jump instruction is written into the computer program text 210, and the cookie is thereafter deleted. In this manner, if one of the instructions being optimized is called by another process while the jump instruction is being written, there is no danger that a partially written jump instruction will be executed. Rather, flow of control will be directed by the cookie to the kernel's illegal instruction handler, which will send control back to the computer program text 210, by which time the jump instruction is completely inserted 430.

Alternatively, the kernel module 240 can guarantee atomicity as follows. Each "page" of computer program text 210 has a list of permissions (Read, Write, Execute). Before any instruction is executed, the processor checks permissions (Read and Execute) and access rights (whether the user has access to that page). To guarantee atomicity, the kernel module makes the page of computer program text 210 containing the optimized instruction(s) nonexecutable during patching 410. After the jump instruction is completely inserted 430 into the computer program text 210, the kernel module 240 resets the Execute permission bit. Thus, if a process attempts to execute the page while the jump instruction is being written, the process is "put to sleep." The kernel module 240 then awakens the process once the jump instruction is inserted 430 and turns the Execute bit back on.

When inserting 430 jump instructions into the computer program text 210, the "reachability" of the jump instruction must also be taken into account. The jump instruction must be a direct branch that specifies the jump target as an offset from the current program counter address. The reachability of the jump instruction is based on the number of bits allocated in the instruction to specify the offset. Modern processors are increasing the number of bits for the offset to increase the reachability, and certain processors provide complete reachability within a 64-bit address space. The present invention, however, is not restricted by reachability of jump instructions. While reachable jump instructions make the implementation of the present invention easier, it is still implementable when reachable jump instructions are not available. If the processor does not have a jump instruction that can reach from the patch location to the translation in the code cache 250, the jump needs to be effected in multiple hops. The hops (except the last one) are to a reachable jumpstation locations. A jumpstation can be free space that is serendipitously available, or free space left in the program text during compilation 290. In the latter case, the program needs to be compiled with a special flag and results in larger program text than before.

After the kernel module 240 patches 410 the computer program text 210, it preferably generates 350 another optimized translation in the same manner. The kernel module 240 examines 360 additional profile data previously provided by the dynamic optimization helper 230 and selects a different portion of computer program text 210 for optimization. That newly selected portion of the computer program text 210 is then copied 370, decoded 380, optimized 390, encoded 400, and used to patch 410 the computer program text 210 in the manner previously described. This loop is repeated until the kernel module 240 has utilized all of the profile data provided by the dynamic optimization helper 230 or the time allotted by the computer operating system kernel 220 for dynamic optimization runs out.

Figure 6:
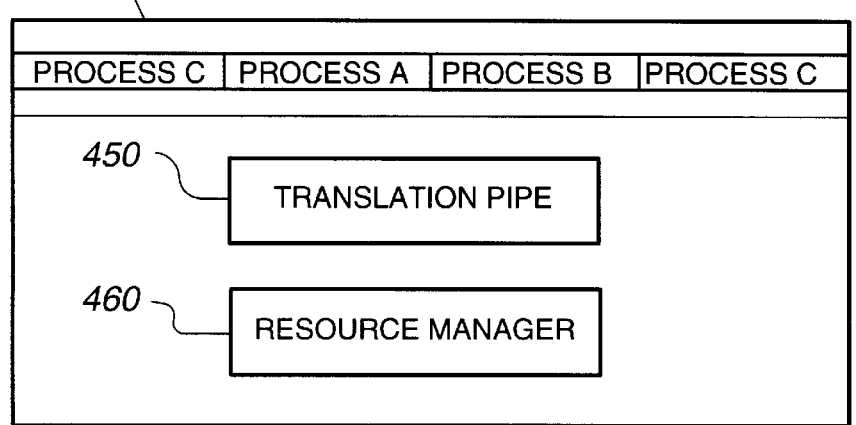
FIG. 6 is a block diagram illustrating a kernel module used in the preferred embodiment of the present invention.

FIG. 6 provides more detail regarding the structure of the kernel module 240. The kernel module 240 can be implemented as a device driver or a dynamically loadable kernel module (DLKM) and preferably includes a memory buffer 440, a translation pipe 450, and a resource manager 460. Profile data sent by the dynamic optimization helper 230 for particular processes (e.g., A, B, & C) are stored in the FIFO memory buffer 440. The buffer 440 and all of the other functions of the kernel module 240 are managed by the resource manager 460. The resource manager 460 allocates space in the buffer 440 for profile data from different processes. The resource manager 460 also allocates time for the translation pipe 450 to perform optimized translations.

For example, the resource manager 460 allocates a preset time for optimization using profile data of a particular process. When that time expires, the resource manager 460 completes any pending translations, and then clears that block of profile data from the buffer 440. In addition, if the buffer 440 is full and a dynamic helper 230 makes a system call for optimization, the resource manager 460 sends back an error message. Also, the resource manager 460 ceases optimization if a process makes a higher priority system call (e.g., an interrupt during the optimization).

The translation pipe 450 reads the profile data and makes decisions as to which part of the computer program text 210 to optimize. Optionally, that decision is made by the dynamic optimization helper 230 and the kernel module 240 simply optimizes all traces sent to it (to the extent possible in the time allotted by the resource manager 460). Whatever traces (or hot instruction paths) to be optimized are then sent to the translation pipe 450, which performs all of the operations shown and discussed in relation to FIG. 5.

Preferably, the dynamic optimization helper 230 provides a significant number of traces (or profile data) to the kernel module 240 so that dynamic optimization according to the present invention can continue for the entire time allotted by the resource manager 460 for such optimization. Once the kernel module 240 is finished generating optimized translations from a particular set of profile data (either because of a time-out or because it has utilized all of the profile data), the kernel module 240 preferably reports back to the dynamic optimization helper 230 as to the number and/or nature of the optimized translations accomplished by the kernel module 240. The dynamic optimization helper 230 then preferably uses that reported information to change the profile data that it collects through the PMUs 90 and to make decisions about what profile data to analyze 330 and provide 340 to the kernel module 240 subsequently.

For example, if the kernel module 240 has performed a high concentration of its previous optimizations in one area of the computer program text 210, the dynamic optimization helper 230 may begin sending the kernel module 240 profile information in higher concentrations from other parts of the computer program text 210. One way to accomplish this is to program the dynamic optimization helper 230 not to form traces of hot instruction paths that include basic blocks residing in the code cache 250. Those of ordinary skill in the art will recognize that the particular decisions made by the dynamic optimization helper 230 to send or not send particular profile data to the kernel module 240 will be based on a variety of factors, and the present invention is not limited to any particular method in that regard. When the dynamic optimization helper 230 has gathered sufficient additional profile information, it makes another system call and provides 340 that profile data to the kernel module 240.

Importantly, the method and apparatus of the present invention can also be used to optimize shared libraries called by a computer program 210. A code cache for each such shared library is allocated at the end of the shared user memory space occupied by the library. In addition, dynamic optimization can be disabled for a particular computer program 210 or for particular subprograms. In the latter case, a compiler can be used to annotate the computer program text 210 to specify regions of the computer program text 210 from which the dynamic optimization helper 230 should not select traces for optimization.

Figure 7:
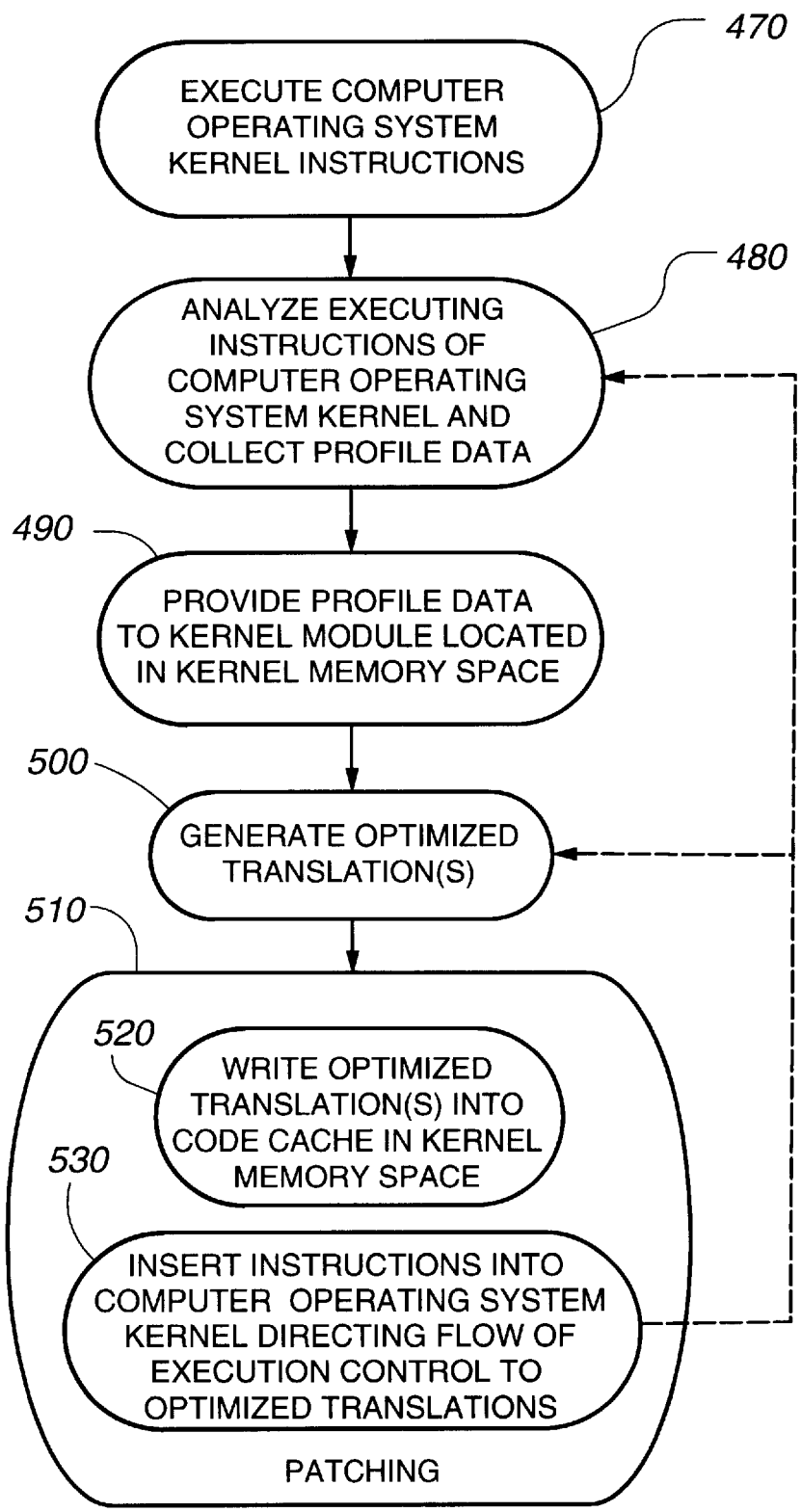
FIG. 7 is a flow chart illustrating a preferred method of the present invention for dynamically optimizing a computer operating system kernel.

FIG. 7 illustrates the basic method of the present invention for dynamically optimizing the computer operating system kernel 220. This embodiment works essentially the same way as the embodiment illustrated in FIG. 4, except that the computer program being optimized is the computer operating system kernel 220, and all of the components of the system are in kernel memory space. First, the computer operating system kernel instructions are executed 470, which will generally be true any time that the computer system 50 is operating. While the computer operating system kernel 220 is executing, a kernel dynamic optimization helper 260, also located in kernel memory space, analyzes 480 the executing instructions and collects profile data regarding the computer operating system kernel 220.

In the manner previously described in relation to FIG. 4, the profile data is compacted and provided 490 to the kernel module 240. Again, the kernel module 240 generates 500 optimized translations based on the profile data, preferably using the same steps as described in relation to FIG. 5. Once the kernel module 240 generates 500 the optimized translations, they are again used to patch 510 the computer operating system kernel 220. This can be accomplished similarly to the manner described in relation to FIG. 4. The optimized translations are written 520 into a code cache 270 allocated at the end of the kernel memory space where the computer operating system kernel 220 is located, and the kernel module 240 inserts 530 appropriate jump instructions in the computer operating system kernel 220 to direct execution flow of control to the optimized translations. Again, this process is preferably repeated such that the computer operating system kernel 220 is continually optimized as it executes.

When optimizing the computer operating system kernel 220, it is preferred that some parts of the kernel 220 not be subject to optimization. This can be accomplished by setting nonoptimizable zones (or memory addresses) within kernel space. The kernel dynamic optimization helper 260 is then programmed to ignore profile data regarding instructions at these addresses. It is preferred that interrupt handlers, the dynamic optimization helper 260, and the code-rewriting kernel module 240 not be subject to optimization.

The present invention has been described in relation to preferred embodiments. Those of ordinary skill in the art will recognize that modifications to the methods and apparatus described herein can be made without departing from the scope of the invention. Accordingly, the present invention should not be limited except by the following claims.

We claim:

1. A method for dynamically optimizing computer programs using a code-rewriting kernel module, comprising the steps of:

loading a computer program to be optimized into shared user-memory space;

executing the computer program;

analyzing the computer program as it executes, including the substep of collecting profile data about the computer program;

providing selected portions of the collected profile data to a kernel module located in kernel memory space;

generating at least one optimized translation of at least one portion of the computer program using the kernel module, the step of generating including using the kernel module to perform the substeps of:

examining the profile data to select at least one portion of the computer program for optimization; and copying the at least one portion of the computer program into kernel memory space; and patching the computer program into shared user memory space using the at least one optimized translation as the computer program continues to execute.

2. The method of claim 1, wherein the step of patching includes the following substeps:

writing the at least one optimized translation into a code cache; and inserting at least one jump instruction into the computer program to direct flow of control to the at least one optimized translation.

3. The method of claim 2, wherein the at least one optimized translation in the code cache is accessible by any computer process having access to the shared user memory space.

4. The method of claim 1, wherein the step of generating includes using the kernel module to perform the following substeps:

decoding the at least one portion of the computer program from an object code to an intermediate code;

optimizing the at least one portion of the computer program based on the profile data; and encoding the optimized at least one portion of the computer program from intermediate code to object code.

5. The method of claim 1, wherein the step of analyzing includes the further substep of reducing the profile data to one or more traces and the step of providing comprises providing the one or more traces to the kernel module located in the kernel memory space.

6. The method of claim 1, wherein the step of analyzing is performed by a dynamic optimization helper located in the shared user memory space.

7. The method of claim 1, wherein the computer program is a shared library.

8. A method for dynamically optimizing a computer operating system kernel using a kernel module located in memory space, comprising the steps of:

executing a computer operating system program kernel located in kernel memory space of a computer;

analyzing the computer operating system kernel as it executes, including the substep of collecting profile data about the computer operating system program kernel;

providing profile data to a kernel module located in the kernel memory space;

generating at least one optimized translation of at least one portion of the computer operating system program kernel using the kernel module;

patching the computer operating system program using the at least one optimized translation as the computer operating system program kernel continues to execute; and loading a dynamic optimization helper into kernel memory space, wherein the steps of analyzing and providing are performed by the dynamic optimization helper.

9. The method of claim 8, wherein the step of patching includes the following substeps:

writing the at least one optimized translation into a code cache located in the kernel memory space;

inserting at least one jump instruction into the computer operating system program kernel to direct flow of control to the at least one optimized translation.

10. A computer system for dynamically optimizing computer programs using a code-rewriting module, comprising:

at least one processor, adapted to execute computer programs, including computer programs that are part of a computer operating system kernel;

a memory, operatively connected to the processor, adapted to store in kernel memory space a computer operating system program kernel and a code-rewriting kernel module, wherein the code-rewriting kernel module is adapted to receive profile data regarding a computer program stored in shared user memory space while the computer program is executing, and to optimize at least a portion of that executing computer program;

a dynamic optimization helper, wherein the dynamic optimization helper is located in shared user memory space and is adapted to analyze the computer program as it executes, collect profile data about the computer program, and provide selected portions of the collected profile data to the kernel module located in kernel memory space; and wherein the kernel module is adapted to generate at least one optimized translation of at least one portion of the executing computer program.

11. The computer system of claim 10, wherein the computer program is a shared library.

12. The computer system of claim 10, further comprising:

a code cache memory, operatively connected to the kernel module and located in shared user space, wherein the kernel module is adapted to write at least one optimized translation into the code cache memory and to insert at least one jump instruction into the executing computer program to direct flow of control to the at least one optimized translation.

13. The computer system of claim 12, wherein the at least one optimized translation in the code cache is accessible by any computer process having access to the shared user memory space.

14. The computer system of claim 10, wherein the kernel module is adapted to:

examine the profile data to select at least a portion of the executing computer program for optimization;

copy the at least one portion of the computer program into kernel memory space;

decode the at least one portion of the computer program from an object code to an intermediate code;

optimize the at least one portion of the computer program based on the profile data; and encode the optimized at least one portion of the computer program from intermediate code to object code.

15. The computer system of claim 10, wherein the dynamic organization helper is further adapted to reduce the profile data to one or more traces and provide the one or more traces to the kernel module.

16. A computer system for dynamically optimizing computer programs using a code-rewriting module, comprising:

at least one processor, adapted to execute computer programs, including computer programs that are part of a computer operating system kernel;

a memory, operatively connected to the processor, adapted to store in kernel memory space a computer operating system program kernel and a code-rewriting kernel module, wherein the code-rewriting kernel module is adapted to receive profile data regarding a computer program stored in shared user memory space while the computer program is executing, and to optimize at least a portion of that executing computer program; and a dynamic optimization helper located in kernel memory space, wherein the dynamic optimization helper is adapted to analyze the computer operating system program kernel as it executes, collect profile data about the computer operating system program kernel, and provide the profile data into the kernel module.

17. The computer system of claim 16, wherein the computer program is the computer operating system program kernel.

* * * * *